UNITED STATES PATENT OFFICE.

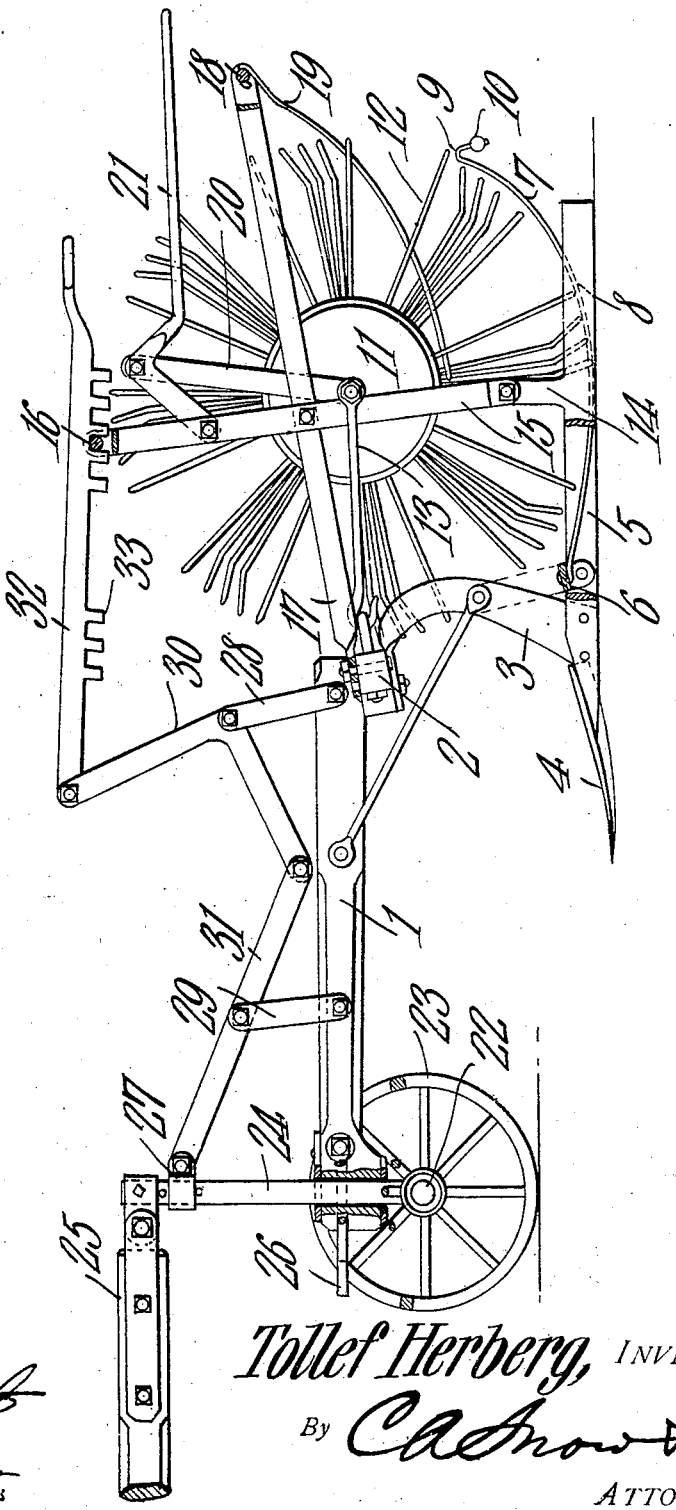

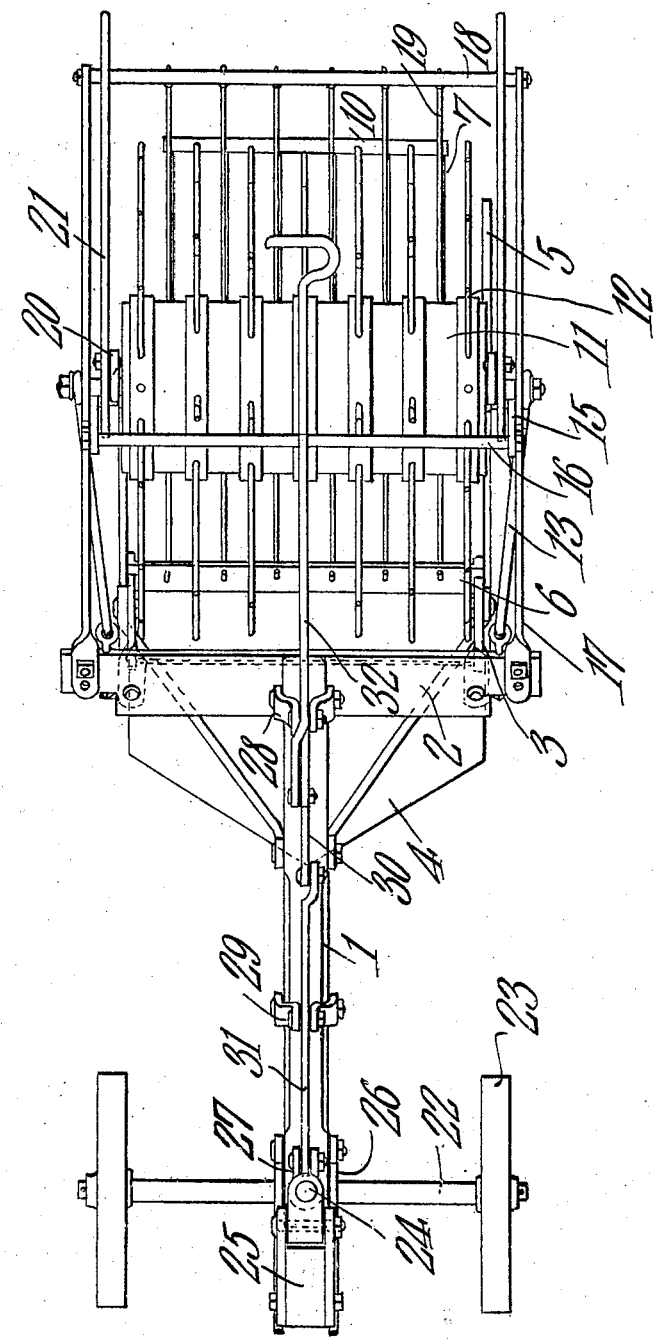

TOLLEF HERBERG, OF HENDRUM, MINNESOTA.

POTATO-DIGGER.

No. 879,543.

Specification of Letters Patent.

Patented Feb. 18, 1908.

Application filed June 21, 1907. Serial No. 380,135.

*To all whom it may concern:*

Be it known that I, TOLLEF HERBERG, a citizen of the United States, residing at Hendrum, in the county of Norman and State of Minnesota, have invented a new and useful Potato-Digger, of which the following is a specification.

This invention has relation to potato diggers and it consists in the novel construction and arrangement of its parts as hereinafter shown and described.

The object of the invention is to provide an implement of the character indicated which is especially adapted to remove potatoes and similar roots from below the surface of the soil and deposit the same upon the surface thereof without injury to the roots.

Means are provided for causing the digging element to operate at any desired depth in the soil and also for elevating the same above the surface of the ground.

The implement consists primarily of a beam to the rear end of which are attached standards which in turn carry a digging blade. Side heels are attached to the said standards at the edges of the said blade and sifting bars are attached at their forward ends to the said blade and extend back between the heels. An actiniform element is arranged to operate above the said bars and is adapted to lift the potatoes above the loose earth and deposit them upon the surface of the soil. A frame extends rearwardly from the beam and fender bars are attached to the said frame and are adapted to keep the actiniform member free of trash, etc. The forward end of the beam is slidably mounted upon a stud carried by a tongue truck and a lever is fulcrumed upon the beam and is connected by links with the beam and the said stud and may be actuated for raising or lowering the beam and the parts rigidly attached thereto.

In the accompanying drawings:—Figure 1 is a side elevation of the digger, and Fig. 2 is a top plan view of the same.

The implement consists of the beam 1 to the rear end of which is attached the cross piece 2. The standards 3 depend from the ends of the cross piece 2 and the blade 4 is attached to the lower ends of the standards 3. The side heels 5 are attached at their forward ends to the lower ends of the standards 3 and are located in alinement with the edges of the blade 4. The cross piece 6 connects the forward portions of the heels 5 together and the forward ends of the sifting bars 7 are attached to the said cross piece 6. The sifting bars 7 are provided with the intermediate synclinal portions 8 and the anticlinal end portions 9, the extremities of which are connected together by a cross rod 10. An actiniform member is provided which consists of a hub 11 having upon its periphery a series of radiating tines 12. The said tines are adapted to pass through the spaces between the bars 7. The links 13 are pivoted at their rear ends to the axis of the hub 11 and at their forward ends to the cross piece 2. The heels 5 are provided at intermediate points and at their upper edges with the upstanding lugs 14.

The uprights 15 are pivoted at their lower ends to the said lugs and are connected together at their upper ends by the cross rod 16. The side bars 17 are attached at their forward ends to the cross piece 2 and at intermediate points to intermediate points of the uprights 15. The rear ends of the side bars 17 are connected together by a cross rod 18. The fender bars 19 are attached to the cross rod 18 and extend forward through the spaces between the tines 12 and terminate under the hub 11. The links 20 are pivoted at their lower ends to the axis of the hub 11 and the lever handles 21 are fulcrumed at their upper ends to the said links and are pivotally attached at their working ends with the uprights 15. The said handles 21 are in the form of bell cranks as illustrated.

A tongue truck is provided which consists of the axle 22 upon the ends of which are journaled the ground wheels 23. The stud 24 is mounted upon the axle 22 and the tongue 25 is hinged to the upper end of the stud 24 and is adapted to swing vertically only with relation thereto. The forward end of the beam 1 is slidably mounted upon the stud 24 and is provided with a clevis 26. The collar 27 is journaled upon the upper portion of the stud 24 but is retained against movement longitudinally thereof. The link 28 is pivoted to the rear portion of the beam 1 and the link 29 is pivoted to the forward portion of the beam 1. The bell crank lever 30 is fulcrumed to the upper end of the link 28 and its working end is pivoted to the power end of the straight lever 31 which is fulcrumed at its opposite end to the collar 27 and is pivotally connected at an intermediate point with the upper end of the link 29. The rod 32 is pivoted to the power end of the lever 30 and is provided upon its under edge with the teeth 33 which are adapted to engage the cross rod 16.

From the foregoing description it is obvious that by moving the rod 32 longitudinally the levers 30 and 31 will be swung so as to raise or lower the beam 1 along the stud 24 and the blade 4 and the heels 5 are correspondingly raised or lowered with relation to the surface of the ground while the tines 12 retain their engagement with the ground. Also by manipulating the handles 21 the uprights 15 may be raised or lowered and the heels 5 and blade 4 correspondingly raised or lowered. Also as the implement is drawn along the row of roots and the blade 4 is lowered below the surface of the soil the said blade will pass below the roots and force them up together with loose earth upon the sifting bars 7. The axially rotating tines 12 will come in contact with the roots and lift them up over the anticlinal portions of the bars 7 and permit the loose earth to pass through the said bars. Thus, the potatoes fall from the bars upon the surface of the soil and the fender bars 19 prevent the accumulation of trash upon the tines 12.

When the digger is in operation the weight of the hub 11 is sufficient to cause the tines 12 to enter the soil to a depth somewhat below the heel of the plow. When it is desired to put the actiniform member out of operation the lever 21 is thrown up and forward so as to rest against the cross bar 16 thereby lifting the said member clear of the ground.

Having described my invention what I claim as new and desire to secure by Letters-Patent is:—

An implement as described comprising a beam having at its forward end a bearing, a stud slidably mounted in the bearing, a wheel supported axle attached to the lower end of the stud, a collar journaled upon the upper portion of the stud, links pivoted to the beam, a straight lever fulcrumed to one of the links and being pivotally connected with said collar, a bell crank lever fulcrumed to the other link, said bell crank lever and straight lever being pivotally connected together, an operating rod pivotally connected to the bell crank lever, a digger attached to the beam and an actiniform member journaled for rotation behind the beam and the digger.

In testimony that I claim the foregoing as my own I have hereto affixed my signature in the presence of two witnesses.

TOLLEF HERBERG.

Witnesses:
 JOHN C. STORDAHL,
 O. H. LEWIS.